(12) United States Patent
Banik

(10) Patent No.: US 11,278,824 B2
(45) Date of Patent: Mar. 22, 2022

(54) DISTILLATION APPARATUS COMPRISING A CHAMBER FOR HOLDING MATERIAL TO BE EXTRACTED AND METHOD THEREOF

(71) Applicant: Russell Distillers Limited, Edinburgh (GB)

(72) Inventor: Abhishek Banik, Chatham (GB)

(73) Assignee: RUSSELL DISTILLERS LIMITED, Edinburgh (GB)

( * ) Notice: Subject to any disclaimer, the term of this patent is extended or adjusted under 35 U.S.C. 154(b) by 441 days.

(21) Appl. No.: 16/310,143

(22) PCT Filed: Jun. 14, 2017

(86) PCT No.: PCT/GB2017/051727
§ 371 (c)(1),
(2) Date: Dec. 14, 2018

(87) PCT Pub. No.: WO2017/216552
PCT Pub. Date: Dec. 21, 2017

(65) Prior Publication Data
US 2019/0255456 A1    Aug. 22, 2019

(30) Foreign Application Priority Data
Jun. 15, 2016   (GB) ..................... 1610417

(51) Int. Cl.
*B01D 3/00*         (2006.01)
*B01D 3/02*         (2006.01)
(Continued)

(52) U.S. Cl.
CPC .............. *B01D 3/004* (2013.01); *B01D 3/02* (2013.01); *B01D 5/0063* (2013.01); *C12G 3/08* (2013.01); *C12H 6/02* (2019.02)

(58) Field of Classification Search
CPC ........ B01D 3/02; B01D 3/004; B01D 5/0063; C12H 6/02; C12G 3/08
See application file for complete search history.

(56) References Cited

U.S. PATENT DOCUMENTS 2,152,318 A     3/1939   Liebman
2,359,860 A  * 10/1944   Kiefer ................... B01D 3/003
                                                  203/82
(Continued)

FOREIGN PATENT DOCUMENTS

CN        1085251 A     4/1994
CN      102151413 A     8/2011
(Continued)

OTHER PUBLICATIONS

International Search Report and Written Opinion corresponding to PCT/GB2017/051727, dated Sep. 11, 2017, 12 pages.
(Continued)

*Primary Examiner* — Anthony J Weier
(74) *Attorney, Agent, or Firm* — J. Clinton Wimbish; Nexsen Pruet, PLLC

(57) ABSTRACT

Apparatus for treating liquids, includes •a vapour inlet (201); •a vessel (202) for housing liquid, the vessel being in fluid communication with the vapour inlet; and, •a vapour outlet (204); configured such that in use •vapour from the vapour inlet passes into liquid housed in the vessel; and •liquid from the vessel can interact with material housed in a chamber (203) in fluid communication with the vessel; •vapour from the liquid can pass to the vapour outlet. The apparatus can be used in distilling spirits in particular gin or rum.

21 Claims, 8 Drawing Sheets

(51) Int. Cl.
*B01D 5/00* (2006.01)
*C12G 3/08* (2006.01)
*C12H 6/02* (2019.01)

(56) References Cited

U.S. PATENT DOCUMENTS

| | | | | |
|---|---|---|---|---|
| 2,383,176 | A * | 8/1945 | Willkie | B01D 3/001 |
| | | | | 426/476 |
| 3,577,320 | A | 5/1971 | Randell | |
| 4,484,983 | A | 11/1984 | Bannon | |
| 4,978,547 | A | 12/1990 | Petershans | |
| 7,780,999 | B2 | 8/2010 | Goodwin et al. | |
| 9,249,381 | B2 * | 2/2016 | Pienaar | B01D 3/005 |
| 2009/0324752 | A1 * | 12/2009 | Lasserre | A61K 8/06 |
| | | | | 424/725 |
| 2011/0315541 | A1 * | 12/2011 | Xu | B01D 3/40 |
| | | | | 203/18 |
| 2017/0225095 | A1 * | 8/2017 | Zajac | B01D 1/02 |
| 2017/0303571 | A1 * | 10/2017 | Alden | B01D 3/10 |

FOREIGN PATENT DOCUMENTS

| | | |
|---|---|---|
| CN | 202638021 U | 1/2013 |
| CN | 103194364 A | 7/2013 |
| CN | 104606909 A | 5/2015 |
| GB | 440610 A | 1/1936 |
| SU | 124907 A1 | 11/1959 |
| SU | 1790967 C | 1/1993 |

OTHER PUBLICATIONS

China Patent Office, Office Action, Application No. 201780036907. 5, dated Oct. 9, 2020.
Federal Service for Intellectual Property, Office Action dated Jun. 2, 2020, Application No. 2019100555/05 dated Jun. 14, 2017.
Federal Service for Intellectual Property, Decision to Grant Patent, Application No. 2019100555/05, dated Jan. 22, 2021.

* cited by examiner

DISTILLATION APPARATUS COMPRISING A CHAMBER FOR HOLDING MATERIAL TO BE EXTRACTED AND METHOD THEREOF

CROSS REFERENCE TO PRIORITY APPLICATIONS

This application is a U.S. National Phase of PCT/GB2017/051727, filed Jun. 14, 2017, which claims the benefit of Great Britain Application Number 1610417.6, filed Jun. 15, 2016, each of which are incorporated herein by reference in their entireties.

SUMMARY

The present invention relates to liquid treatment apparatus, apparatus for distillation, methods for treatment of liquids and for distillation, and products produced by said methods for treatment of liquids and for distillation.

The invention is illustrated by, but not limited to, methods for making a distilled alcoholic beverage, for example gin or rum. The invention can however be used for making other products, for example, perfumes.

It has been well known for many years how to prepare a gin by distilling alcoholic spirits over flavouring materials, which contain essential oils that are extracted during the process of distillation, so as to impart the desired flavour and aroma to the alcoholic spirits. The flavouring materials that are generally used include, but not limited to, one or more of the following:

Juniper berries, coriander seed, cardamom seed, *angelica* root, anise seed, *cassia* bark, fennel seed, orris root, liquorice, orange peel, lime leaves.

Gin, originally produced by the Dutch as Jenever (genievre, genever), was produced by distilling a mash, which consisted of rye, corn and malt, with which juniper berries had been mixed.

The "English process" consists of first separating alcohol from a mash by means of distillation, and then subsequently redistilling the spirit so obtained, in a pot still, with juniper berries and other flavouring materials.

For re-distillation in the pot still, the flavouring materials are added in the pot or placed in a so-called "gin head" which is merely a chamber equipped with a basket where the flavour materials are held.

In the method where the flavouring materials are added to the pot, the flavour materials are boiled with alcohol in liquid phase and the aromatic constituents of these flavouring materials gets extracted with the evaporation of alcohol as vapour.

In the "gin head" method, the liquid spirits do not touch any of the flavouring materials, and solely the vapour of the alcohol extracts the aromatic constituents of these flavouring materials.

There are distinctive disadvantages in both of the above methods of gin distillation.

With pot distillation, the heat source is present locally, and the high temperature experienced in the liquid, may lead to burning and stewing of the flavour materials and result in the deterioration of the flavour materials and the volatile aroma compounds.

The second method, using the "gin head" addresses this issue, and as such gained much popularity. However, in this method solely the vapour of the alcohol extracts the aromatic constituents of these flavouring materials. This leads to under-extraction of flavour and aroma compounds. In addition, the lack of liquid phase boiling reduces the formation of secondary flavour compounds produced by chemical reactions such as esterification and Maillard reactions, leading to sharp and inferior gin.

In recent years, to address both of these issues, distillation under vacuum or reduced atmospheric pressure has been introduced (e.g. WO2007/143192). Vacuum distillation has been unpopular due to its high setup cost and reduced ability to support secondary flavour compounds production due to low temperature boiling.

Rum production has been practiced all over the world typically using sugarcane juice and/or molasses using batch pot still or a continuous distillation column. Rum is loosely divided into three groups: dark, amber and white. Dark rums are high ester rum and white rums are very low in esters; amber rum generally lies to the lighter end of the scale for ester content.

To broadly describe rum production process, the raw material, i.e., sugar cane juice or molasses are mixed with a quantified amount of water to reach a calculated gravity (sugar content). This diluted mix is called "wort". Yeast is added to the wort and fermentation is carried out for two to five days. After the fermentation the liquid is called "wash" which typically has 8-10% alcohol by volume (abv). This wash is then distilled, in a batch distillation process, to collect "low wines" or "high wine", (distinguishable by alcohol content by % abv). The low/high wine is further distilled to produce rum. The sources of esters in the rum are from the raw material, type of yeast and fermentation technique, and the distillation technique has a considerable effect on the nature of rum produced.

To produce heavy rums a batch distillation process is practiced to retain the esters. Continuous column stills, (e.g. Coffey stills), are widely used to produce light and amber rums.

The continuous stills are efficient in removing heavy esters and are effective at large scale production of consistent product variety. On the other hand the disadvantage of the continuous still is its inability to produce a variety of rums in small batches. This is the reason only large production houses use Coffey stills.

Most craft distilleries use batch pot stills, due to restricted capital and requirement of smaller volume of product. But at the same time the craft distilleries struggle to produce light style rum through their batch pot stills, and have to perform several distillations while producing lighter rum varieties.

Sulphur produced during fermentation is often a problem in the batch distillation system for rum and demands plenty of copper contact and reflux to remove sulphur. If not removed properly the sulphur leads to several off-flavours. This forces the craft distillers to increase the number of distillations or install expensive modifications, such as double retorts or column heads, which will otherwise not be required for heavy rum products.

Since using a basic pot batch still to produce a variety of product often leads to substandard produce, it has been a common practice to treat distilled alcoholic beverages post-distillation, so as to remove certain undesirable ingredients. These after treatments are expensive and can remove some of the desired volatile flavouring ingredients.

The inventor has observed that in making gin an important factor is the temperature at which the still is operated and the solvent concentration, in order to extract the desired flavour compounds. If the temperature and solvent concentration within the still is too low, sufficient essential oils or other flavouring compounds are not extracted from the flavouring materials.

If the temperature and solvent concentration of distillation is too high, or if the operation is carried on for too long a time, then the berries and herbs and other flavouring materials will give off substances, which impart very undesirable properties to the product.

There remains a need for a distillation technique for craft distilleries that will increase their flexibility and cater for the production of a variety of superior quality alcoholic beverages in small batches.

There is further a demand for distillation apparatus usable for production of a variety of alcoholic beverages in small batches.

There is further a demand for distillation apparatus usable for extraction of botanical substances with reduced degradation thereof.

The present invention provides: —
new apparatus for treating liquids
new distillation apparatus
new methods of distillation
new methods for production of flavoured/coloured spirits and the products of such methods
as set out in the claims and in the light of the following non-limited exemplary description.

DETAILED DESCRIPTION

According to a preferred form of the disclosure, alcohol or neutral alcohol is distilled at normal temperature but interaction with flavour materials is carried out at lower temperature than usual, i.e. 85-90° C., and selective solvent concentration in different chambers.

Figure 5:
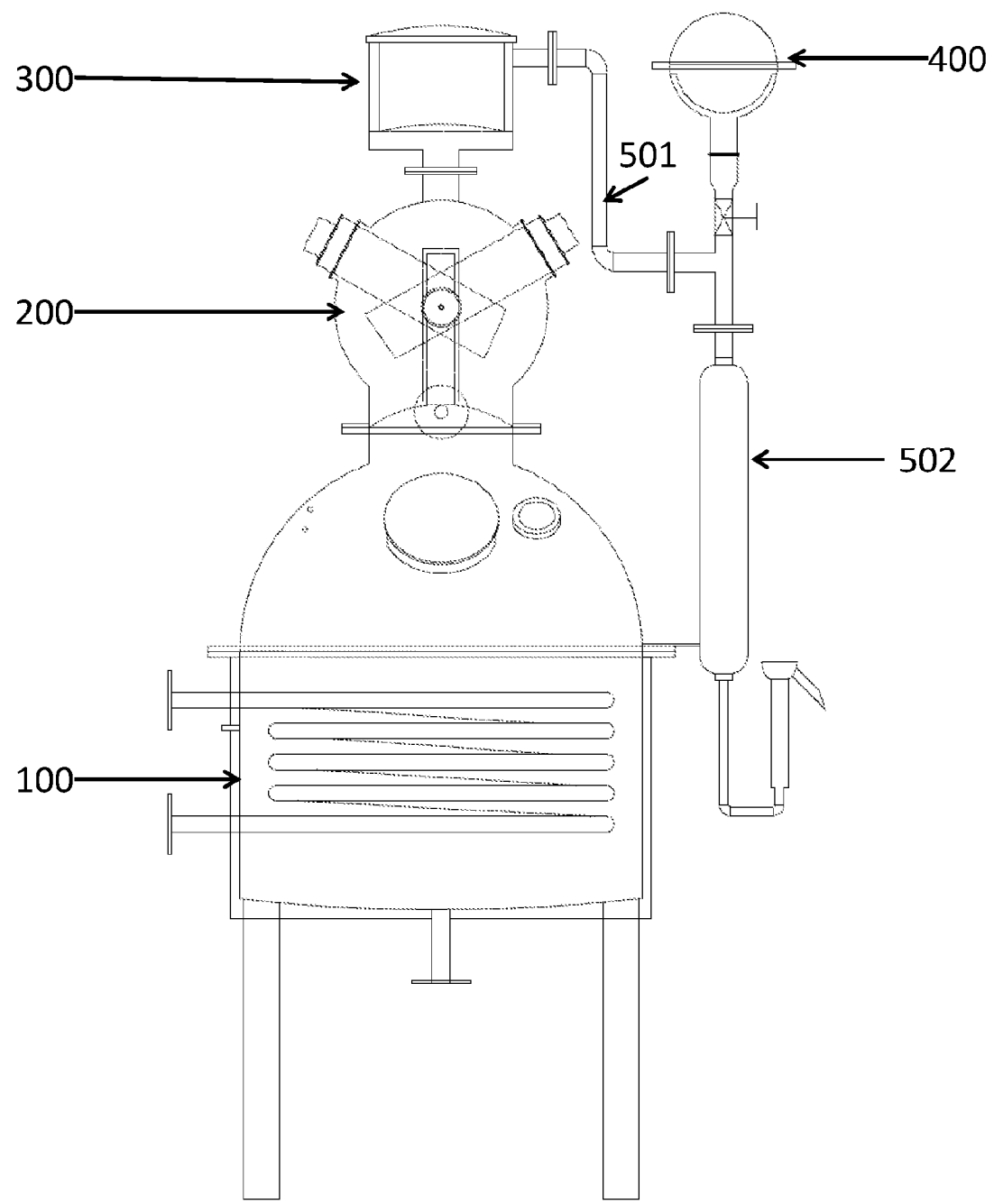
FIG. 5 is a schematic diagram of distillation apparatus comprising the boiler, liquid treatment apparatus, and first and second reflux chambers of FIGS. 1-4.

FIG. 5, shows distillation apparatus 500 comprising: —
A vapour source 100;
A liquid treatment apparatus 200;
A vapour treatment chamber 300;
A vapour/liquid chamber 400;
The construction of these integers is set out below Vapour Source 100

Figure 1:
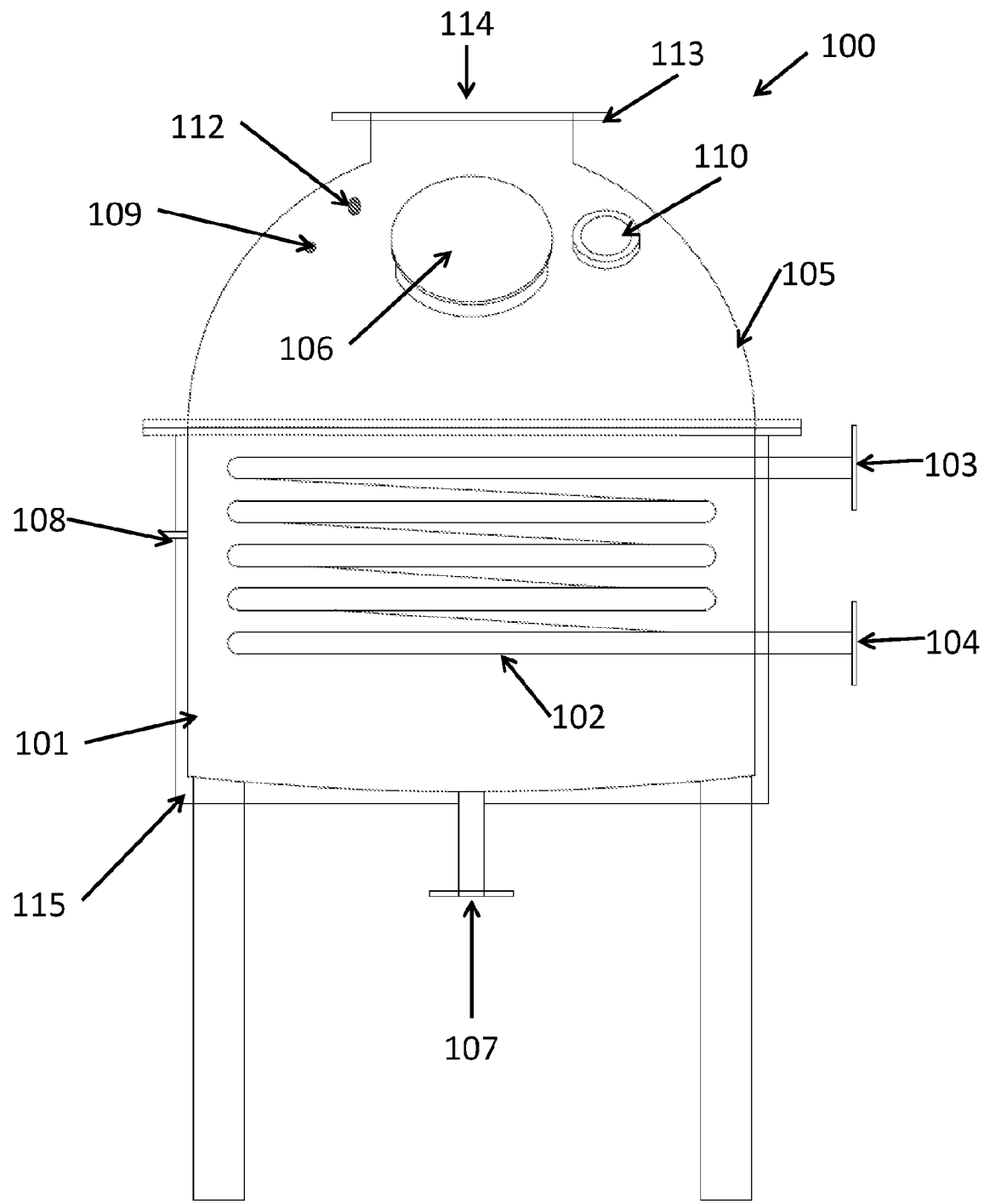
FIG. 1: is a schematic diagram of a boiler as shown in the distillation apparatus of FIG. 5.

FIG. 1 shows a vapour source 100 comprising a reservoir 101 having an internal steam fed heating coil 102 for heating material housed in the reservoir 101. The coil comprises a steam inlet 103 and steam condensate outlet 104. Alternative or additional means of heating can be provided (for example, and without limitation, electrical heating coils, microwave sources) and the present disclosure is not limited to any particular means of heating.

The reservoir 101 is formed of any suitable material and may, for example, be formed of steel or other metal. The present disclosure is not limited to any particular material for the reservoir 101.

Above the body of the reservoir 101 is reservoir cap 105, which is formed of any suitable material and may, for example, be formed of copper or other metal. Use of copper for the reservoir cap 105 can help in the removal of sulphur in use. The present disclosure is not limited to any particular material for the reservoir cap 105.

A useful combination may be to provide a stainless steel reservoir 101 (e.g. SS340 stainless steel) and a copper reservoir cap 105, but the present disclosure is not limited to this combination.

In addition, although the reservoir cap 105 is shown as a dome, other shapes fall within the scope of this application (for example, without limitation, a flat cap, or a fluted cap).

The reservoir 101 and reservoir cap 105 are shown with associated: —
access port 106, to permit loading and unloading of material to the reservoir.
drainage valve 107 to permit release of liquid (e.g. spent lees) from the reservoir
liquid temperature gauge 108
vapour temperature and pressure gauge 109
observation port 110
pressure relief/anti-vacuum valve 112
flanged coupling 113 but the present disclosure does not rely on the presence of any of these integers, nor does it rely on their specific location or configuration.

The reservoir 101 is clad in insulation 115, which may be of any suitable form (for example, and without limitation, foam insulation, or blanket insulation). The present disclosure is not limited to any particular means of insulation, nor is it limited to requiring any insulation.

In use, heating material housed in the reservoir 101 provides vapour which escapes via vapour exit port 114, shown as defined by the flanged coupling 113. As shown, vapour exit port 114 is at the top of the reservoir cap 105, but this location is not essential to the present disclosure.

Liquid Treatment Apparatus 200

Figure 2:
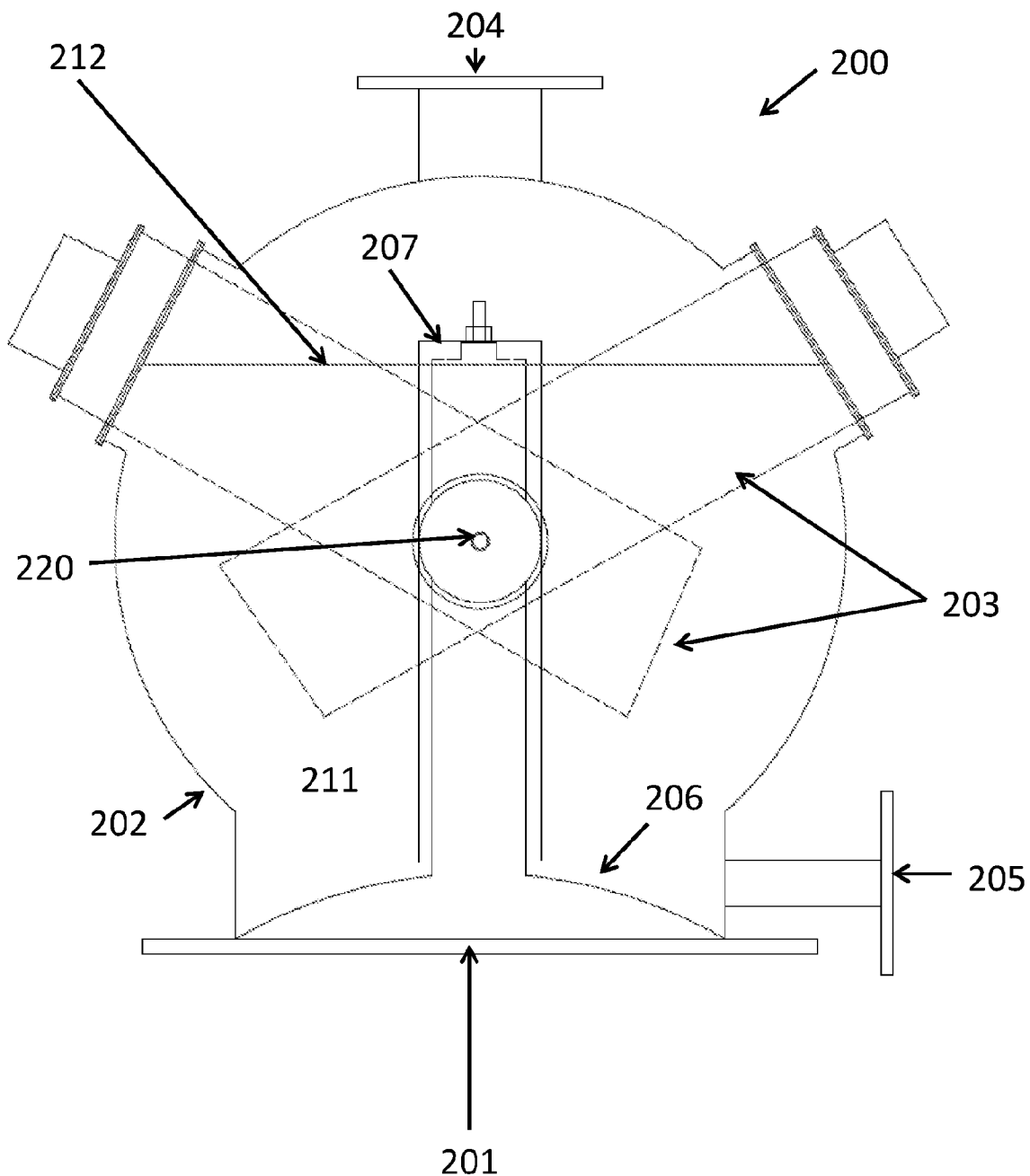
FIG. 2: is a schematic diagram of apparatus for treatment of liquid, in accordance with another aspect of the present disclosure, and as used in the distillation apparatus of FIG. 5

FIG. 2 shows a liquid treatment apparatus 200 comprising a vapour inlet 201, a vessel 202 in fluid communication with the vapour inlet 201, a pair of chambers 203 in fluid communication with the vessel 202; a vapour outlet 204, and a drainage port 205.

Figure 6:
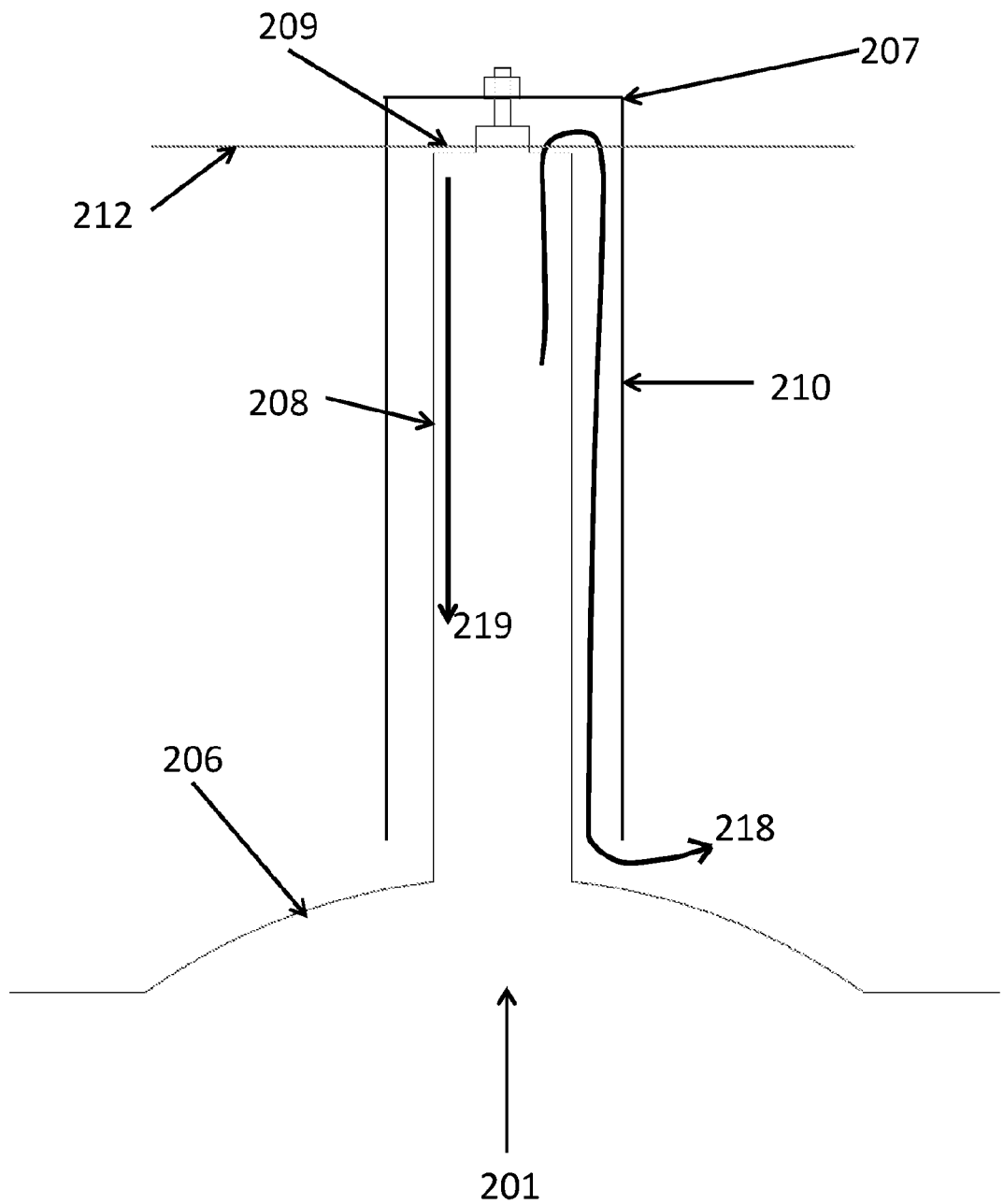
FIGS. 6 and 7 are expanded schematics showing parts of the apparatus for treatment of liquid shown in FIG. 5

The base of the vessel 202 is defined by a domed base part 206 on which is mounted a bubble cap 207 shown in greater detail in FIG. 6. The present disclosure is not limited to the base being domed in form, nor to the use of a bubble cap, but these are convenient ways of exercising the invention.

The bubble cap comprises a tube 208 having a permeable region 209 toward its top. A tube 210 is mounted on the tube 208 such that in use vapour entering the vapour inlet 201 may pass up the tube 208, through the permeable region 209, and back down a space defined between the inner wall of tube 210 and outer wall of tube 208, as shown as arrow 218 to enter liquid 211 housed in the vessel 202. In addition, excess liquid in the vessel 202 can spill over the permeable region 209 and run down the inside of tube 208 as shown by arrow 219. By this means, the level of liquid surface 212 of the liquid 211 is maintained level with the permeable region 209 and excess liquid passes back to the vapour source 100.

The temperature of liquid 211 may be measured using temperature sensor 220 and the temperature of vapour above liquid surface 212 may be measured if required by further sensors (not shown).

Figure 7:
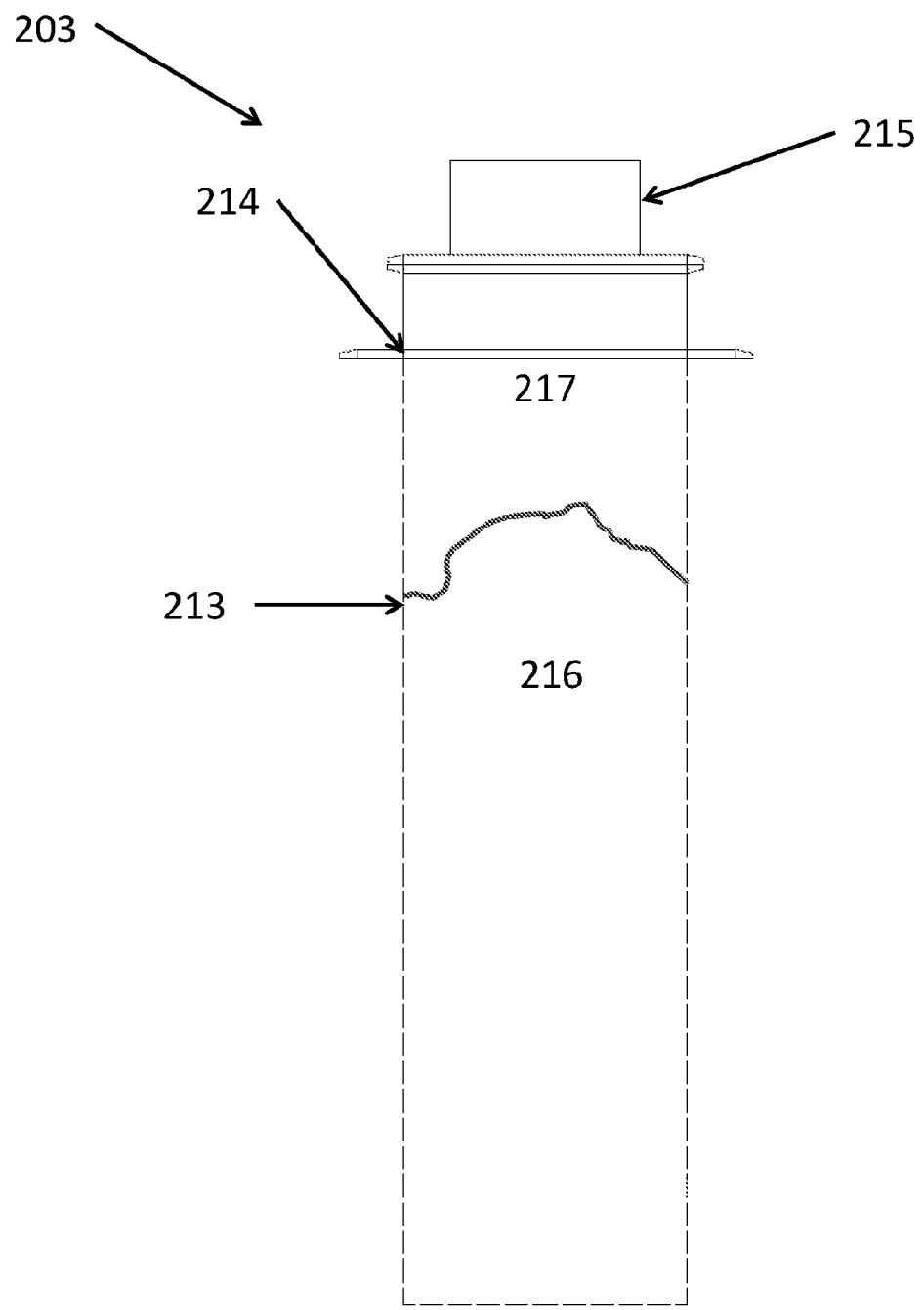

The chambers 203 are shown in greater detail in FIG. 7. A chamber 203 comprises a tubular body 213 of permeable material (e.g. using 3 mm perforated stainless steel 304 tube that provides 33% open area); a neck portion 214 and a closure 215. The neck portion 214 is configured to permit removable connection to the wall of the vessel 202, and the closure 215 is configured to permit loading and unloading of material 216 to the interior 217 of the chamber. The present disclosure is not limited to the use of chambers of the material or form described; nor is it limited to the chambers being inside the vessel 202. For example material may pass out of the vessel 202, and into an external chamber.

In addition, although the construction illustrated shows the vapour outlet coming from the vessel 202, the vapour outlet may alternatively come from a chamber.

In use, liquid housed in the vessel 202 can enter the chamber 203 to interact with material 216 housed in the chamber 203. While the above describes passive flow into the chamber, flow may be forced flow, e.g. through pumping or stirring.

Vapour Treatment Chamber 300

Figure 3:
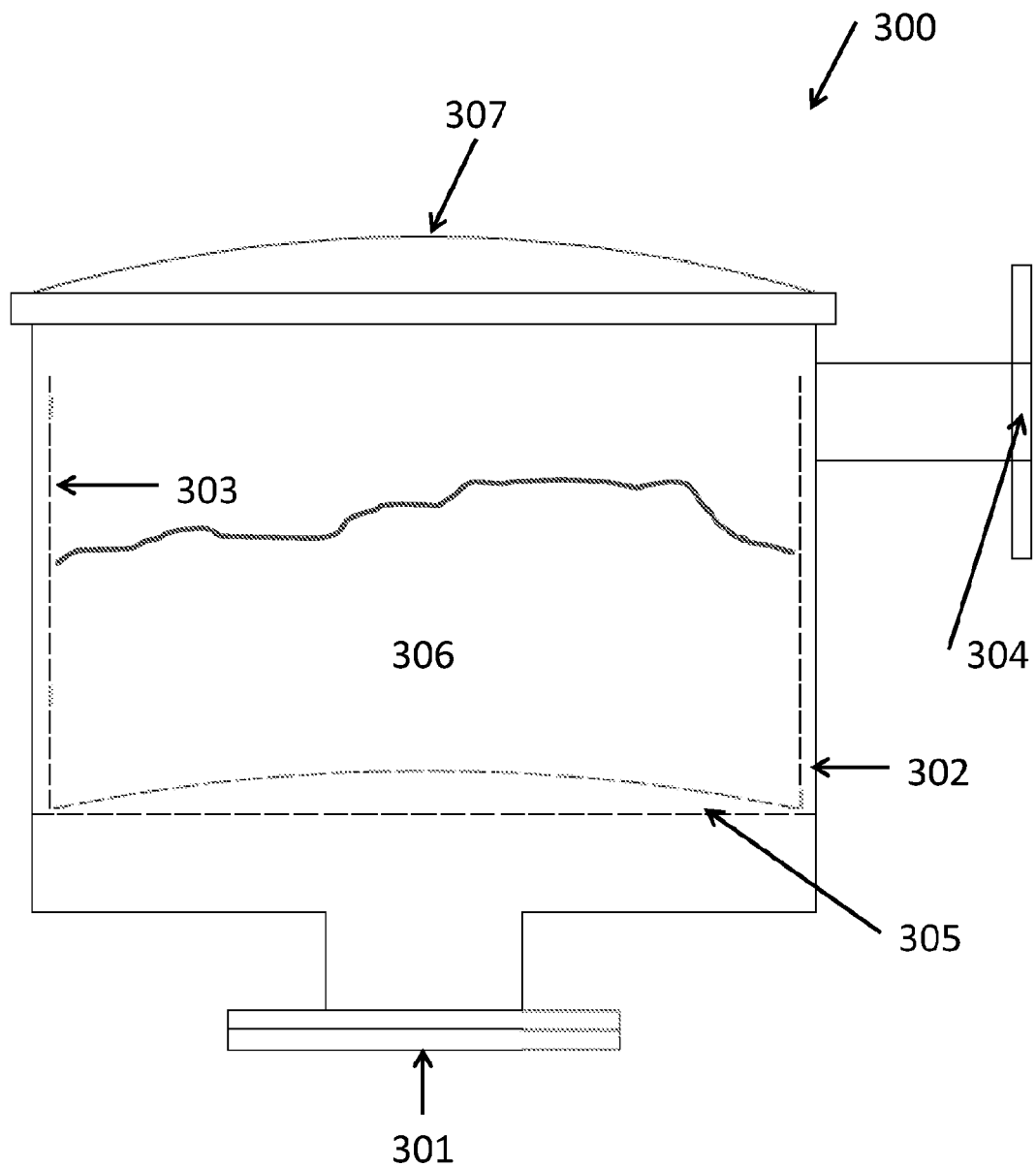
FIG. 3: is a schematic for a reflux chamber as shown in the distillation apparatus of FIG. 5.

FIG. 3 shows vapour treatment chamber 300 comprising a vapour inlet 301, a vessel 302 in fluid communication with the vapour inlet 301, a removable basket 303 housed in the vessel 302, a vapour outlet 304, and a lip 305, on the interior of the vessel 302, on which the basket 303 sits. In use the basket can contain materials 306 for interaction with vapour/liquid refluxing in the chamber. In distilling, chambers of this general type are conventionally referred to as Carter Heads.

The vapour treatment chamber 300 is shown with a hinged lid 307 through which the removable basket and carried materials may be loaded and unloaded.

The present disclosure is not limited to the use of vapour treatment chamber 300 of the form described, and any arrangement that permits vapour to interact with material housed in the vapour treatment chamber 300 is encompassed by the present disclosure.

Vapour/Liquid Chamber 400

Figure 4:
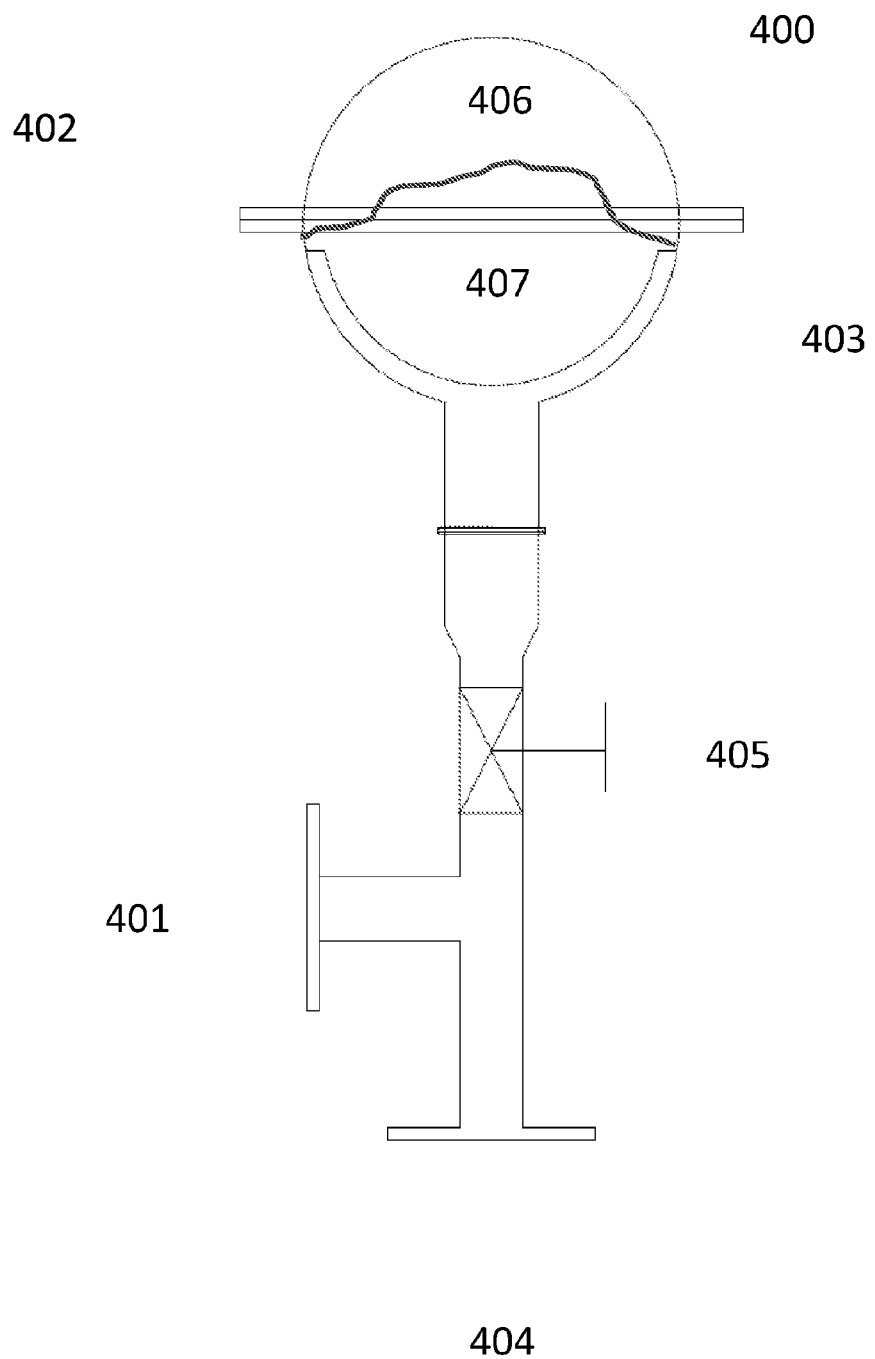
FIG. 4: is a schematic for a second reflux chamber as shown in the distillation apparatus of FIG. 5.

FIG. 4 shows vapour/liquid chamber 400 comprising a vapour inlet 401, a vessel 402 in controlled fluid communication with the vapour inlet 401 via valve 405, a permeable barrier 403 housed in the vessel 402, and a distillate outlet 404. In use the vessel 402 houses material 407 (supported by permeable barrier 403) for interaction with vapour/liquid in the chamber.

The vapour exchange with the vessel 402 is controlled by the valve 405, enabling control of the interaction time and solvent concentration for the interaction process.

The vessel 402 is shown with a flanged construction to assist loading and unloading of material 407.

The present disclosure is not limited to the use of vapour/liquid chamber 400 of the form described, and any arrangement that permits interaction of vapour and liquid with material housed in the vapour/liquid chamber 400 is encompassed by the present disclosure Distillation Apparatus 500

As stated above, distillation apparatus 500 comprises: —
A vapour source 100;
A liquid treatment apparatus 200;
A vapour treatment chamber 300;
A vapour/liquid chamber 400;

In more detail,
The vapour exit port 114 of vapour source 100 is connected to the vapour inlet 201 of liquid treatment apparatus 200;
The vapour outlet 204 of liquid treatment apparatus 200 is connected to the vapour inlet 301 of vapour treatment chamber 300;
The vapour outlet 304 of vapour treatment chamber 300 is connected via lyne arm 501 to the vapour inlet 401 of vapour/liquid chamber 400;
The distillate outlet 404 is where the distilled product is produced and can be connected as desired (e.g. to a condenser 502, a reservoir, or for further processing). Condenser 502 may be a heat exchanging condenser for removing heat from the final product and to condense the vapour to liquid form for collection.

Distillation Process

Figure 8:
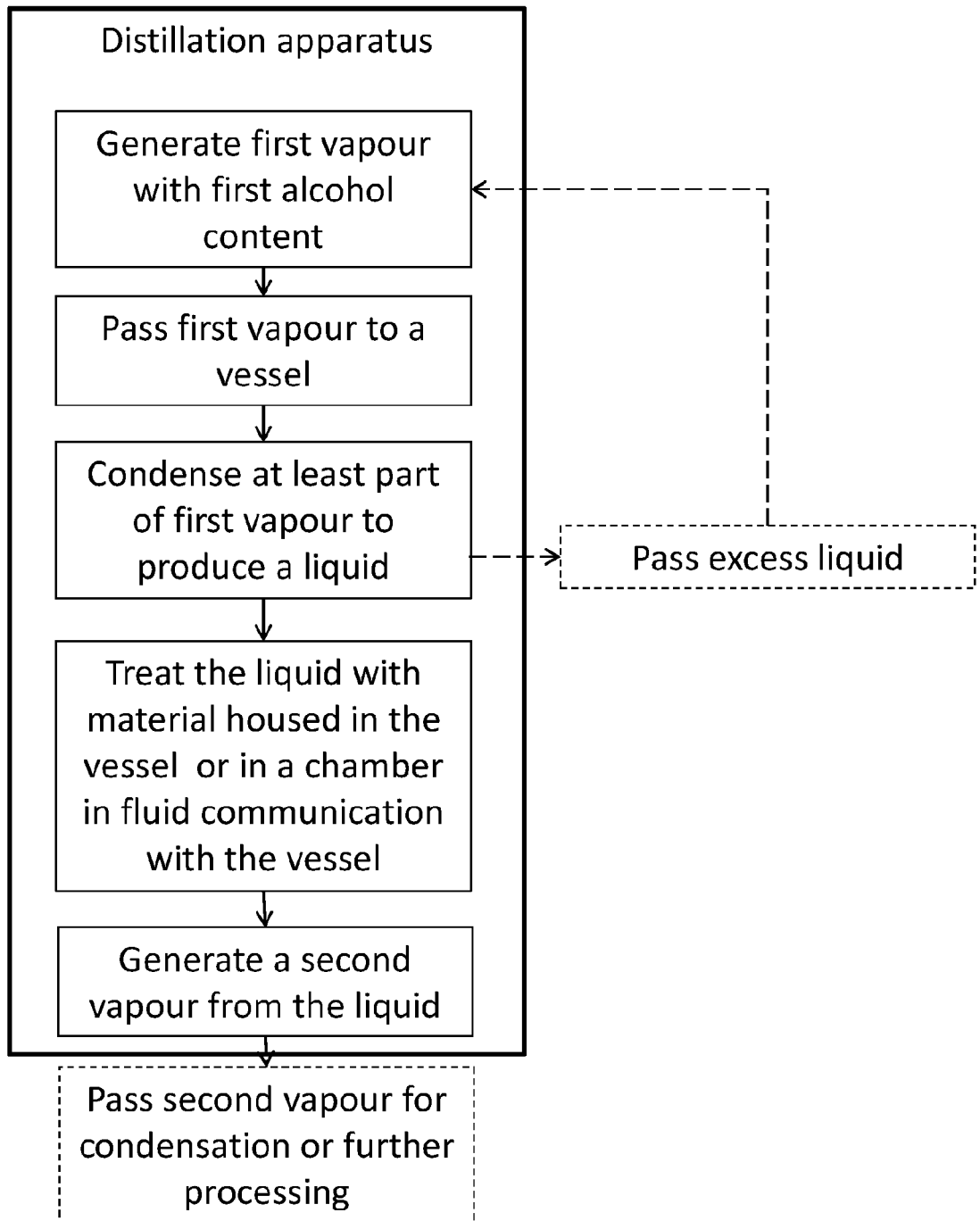
FIG. 8 is a flow chart for a distillation method in accordance with the present disclosure.

FIG. 8 shows a distillation process in which distillation apparatus 800 is used. The distillation apparatus may be distillation apparatus as described above or other apparatus performing the following functions:
801 generating a first vapour having a first alcohol content;
802 passing the vapour to a vessel, and condensing at least part of the vapour to produce a liquid;
803 treating the liquid with material housed in the vessel or in a chamber in fluid communication with the vessel
804 generating a second vapour from said liquid.
With optional steps of:
805 passing the second vapour for condensation or further processing
806 passing excess liquid to generate more vapour.

Example of Typical Manner of Operation—Gin Distillation

In gin production the vapour source 100 is used as a boiler for raw materials in a conventional manner.

The raw materials may be provided through access port 106. If desired some flavouring materials that require high temperature extraction to develop best flavour may be included in the raw materials, but this is not essential.

In the liquid treatment apparatus 200 alcohol from the vapour source 100 will condense, supplying heat to the liquid treatment apparatus 200 and resulting in the presence of liquid 211. In operation, some liquid 211 may be provided as an initial charge to commence the process.

In operation, vapour loss from the surface 212 of the liquid 211 will both maintain the temperature of liquid 211 at or below the boiling point for the liquid 211, and supply vapour to vapour outlet 204. Because the vapour from the vapour source 100 will be enriched in alcohol in comparison to the initial raw materials, the composition of liquid 211 will be enriched in alcohol in comparison to the initial raw materials, and so have a lower boiling point.

In the vessel 202 the liquid 211 will be free to permeate into chambers 203 and interact with materials 216 (e.g. flavouring materials) housed therein, extracting volatiles from the materials. This liquid extraction takes place at or below the boiling point of the liquid 211, i.e. at a lower temperature than prevails in the vapour source 100.

Such lower temperature liquid extraction offers much of the benefit of distillation under vacuum or reduced atmospheric pressure without the high setup costs. The alcohol content of the liquid 211 can be controlled either passively, by virtue of the concentration and temperature of the vapour from the vapour source; or actively, by supply of additional heating and/or additional alcohol or water. This permits the extraction conditions to be controlled based on the type of flavour material and the ideal extraction concentration and temperature.

Vapour departing the liquid treatment apparatus 200 then passes into vapour treatment chamber 300 where, in conventional manner, the vapour can interact with material 306 (e.g. flavourings) held in the basket 303 and extract volatiles from material 306 into the vapour. Typical materials include flavour materials that require vapour phase extraction and long vapour contact as the ideal extraction condition.

Vapour departing the vapour treatment chamber 300 passes through lyne arm 501, where at least a portion condenses, with the condensate passing directly from the vapour inlet 401 of vapour/liquid chamber 400 to the distillate outlet 404. By operation of valve 405, a portion of the vapour may be permitted to enter the vessel 402 where it may condense so that material in the vessel 402 interacts with both liquid and vapour in the chamber.

For gin production the vapour/liquid chamber 400 holds flavour materials that require vapour phase extraction and short vapour contact as ideal extraction conditions. Accordingly, the vapour/liquid chamber 400 can be used to house the most delicate of flavourings (those that would be destroyed by higher temperature extraction) and can even include material containing colorants for the gin.

Example of Typical Manner of Operation—Rum Distillation

In rum production the basic process is the same as in gin distillation but the materials used at the various steps differ. Rum production is more akin to purification of the initial material than addition of flavourings to the material.

In rum production the vapour source 100 acts as the first pot that holds the wash, at 8-10% abv.

Vapour passing to the liquid treatment apparatus 200 interacts with liquid, which may comprise heads and tails from previous distillation, held in chamber 202, and thereby interacts with purifying substances (e.g. charcoal) housed in the chambers 203 that will adsorb undesirable flavour compounds in liquid phase.

Vapour passing to the vapour treatment chamber 300 the liquid treatment apparatus 200 interacts with selected column packing materials 306 housed in the basket 303, e.g. raschig rings, structured column packing or wire mesh column packing; to achieve required reflux and/or sacrificial copper contact.

Different packing materials have varied reflux ratios, which provides the apparatus flexibility to produce range of rum variety by altering the packing material.

The hinged lid 307 on vapour treatment chamber 300 assists loading and unloading of packing material.

For rum production the material 407 in the vapour/liquid chamber 400 may holds adsorbent, e.g. charcoal, to adsorb undesirable flavour compounds in vapour phase.

The heads and tails that result from the distillation process of rum may be collected separately. The heads and the tails refer to the first and last parts resulting from the distillation process. They may contain high percentage of esters and off-flavour compounds and they can therefore be separated and redistilled.

General Distilling Process

The use of a liquid treatment chamber as described provides a double distillation, the first with the liquid at the temperature of the material in the reservoir 101; and the second at a lower temperature limited by the boiling point of the liquid 211 in the liquid treatment apparatus 200.

This permits:—
liquid extraction of flavourings and aromas at a temperature below the temperature of the material in the reservoir 101;
double distillation in a single apparatus;
liquid phase removal of impurities during distillation.

The additional use of vapour treatment chamber 300 permits:—
vapour phase extraction in addition to liquid phase extraction;
vapour phase removal of impurities during distillation.

The additional use of vapour/liquid chamber 400 permits:—
vapour phase extraction in addition to liquid phase extraction;
vapour phase removal of impurities during distillation;
the extraction of flavours and colourants at low temperature.

It should be noted that:—
the use of vapour treatment chamber 300 is optional;
the use of vapour/liquid chamber 400 is optional;
in the distillation column there may be more than one liquid treatment apparatus 200
in the distillation column there may be more than one vapour treatment chamber 300
in the distillation column there may be more than one vapour/liquid chamber 400
the liquid treatment apparatus 200 may be used in combination with a vapour source other than that described above.

Advantages of the processes described include that:—
a) In the distillation of gin, the extraction of flavour compounds from flavour materials could be performed in both liquid and vapour phase of the alcohol;
b) In the distillation of gin, a short-path extraction method can be achieved permitting selection of the extraction/interaction time, period and ideal solvent concentration along the distillation process;
c) In the production of distilled beverages, an inline colour extraction method can be achieved to produce coloured distilled beverage;
d) In the distillation of rum, a two stage distillation is achieved through one distillation process
e) In the distillation of rum varieties of dark, amber and light rum may be produced through just one or two distillations;
f) In the distillation of rum, undesirable flavour compounds can be eliminated by adsorption using adsorbent materials.
g) In the distillation of rum, controlled reflux can be achieved to improve the copper-vapour contact to produce a variety of heavy and light superior rum.
h) In the distillation of gin, secondary flavour compounds created in liquid can coexist with delicate vapour phase extracted flavours to produce rounded flavour gin
i) Flavour materials may be extracted in different extraction chambers based on the levels of flavour active compounds in them, and their best suited extraction condition.

The present disclosure provides:
a) The distillation of gin, by synchronising various factors, especially the temperature and vapour pressure which exists in the still and flavour extraction solvent phase, so as to control the extraction of desirable flavours; eliminating the formation and extraction of certain undesirable ingredients from the flavouring raw material, the botanicals and herbs.

b) Methods whereby the flavouring materials can be placed such that the flavour active compounds can be extracted at different concentrations and phase of carrier solvent, ethanol, so that efficient volatile organic compounds extraction are achieved without heat deterioration of delicate flavour materials.

c) Methods whereby extraction of flavour active compounds could be achieved for highly delicate flavour compounds in a required short period of time, with a capability of extracting the colour from the materials without degradation.

d) Methods whereby the rum wash and the high wine (intermediate) could be loaded to the still to provide two-stage distillation in one distillation process.

e) Adsorption chambers for removal undesirable flavour compounds during distillation to produce rum with desirable organoleptic characters.

f) Reflux chambers to increase the efficiency of the distillation and improve the copper-vapour contact to produce superior rum.

In the above disclosure, liquid from the vessel interacts with material housed in the vessel. The materials with which the liquid interacts are solid or immobilised materials and include, without limitation, flavouring materials and adsorbent materials as referred to above.

Other variants of the above disclosed apparatus and methods may be provided and remain in the scope of the appended claims.

The invention claimed is:

1. An apparatus for treating liquids, the apparatus comprising:
   a vapour inlet;
   a vessel for housing liquid;
   a chamber configured to contain at least one solid material; and
   a vapour outlet;
      wherein the vapour inlet, the chamber, and the vapour outlet are in fluid communication with the vessel for housing liquid; and
      wherein the apparatus is configured such that:
         vapour passes from a vapour source into a liquid housed in the vessel via the vapour inlet at or above atmospheric pressure;
         the liquid interacts with the at least one solid material contained by the chamber at or above atmospheric pressure; and
         vapour from the liquid passes to the vapour outlet.

2. The apparatus of claim 1, wherein the chamber is housed within the vessel.

3. The apparatus of claim 1, wherein the vapour passes directly from the vessel to the vapour outlet.

4. The apparatus of claim 1, wherein the chamber is in fluid communication with the vessel via a perforated wall.

5. The apparatus of claim 1, further comprising one or more of at least an additional vapour inlet, an additional vessel, an additional chamber, and an additional vapour outlet.

6. The apparatus of claim 5, wherein at least one of the vessel and an additional vessel is in fluid communication with a plurality of chambers.

7. A distillation apparatus comprising an apparatus for treating a liquid and a vapour source configured to supply vapour to a vapour inlet of the apparatus, the apparatus comprising:
   the vapour inlet;
   a vessel for housing liquid;
   a chamber configured to contain at least one solid material; and
   a vapour outlet;
      wherein the vapour inlet, the chamber, and the vapour outlet are in fluid communication with the vessel for housing liquid; and
      wherein vapour passes into a liquid housed in the vessel via the vapour inlet at or above atmospheric pressure;
      the liquid interacts with the at least one solid material at or above atmospheric pressure; and
      vapour from the liquid passes to the vapour outlet.

8. The distillation apparatus of claim 7, wherein the vapour source comprises a reservoir for raw material and a heat source for heating material housed in the reservoir.

9. The distillation apparatus of claim 7, wherein the vapour outlet is in fluid communication with one or more vapour treatment chambers, and wherein vapour may interact with material present in the one or more vapour treatment chambers.

10. The distillation apparatus of claim 7, wherein the vapour outlet is in fluid communication with one or more vapour/liquid treatment chambers, and wherein vapour and refluxing liquid may interact with material present in the one or more vapour/liquid treatment chambers.

11. The distillation apparatus of claim 9, wherein material present in the one or more vapour treatment chambers comprises at least one of raschig rings, structured column packing, and wire mesh column packing.

12. The distillation apparatus of claim 7, wherein the vapour outlet is in fluid communication with one or more vapour treatment chambers and/or one or more vapour/liquid treatment chambers, the one or more vapour treatment chambers and/or one or more vapour/liquid treatment chambers comprise a container configured to contain material and enable interaction between the material and at least one of vapour and refluxed liquid.

13. A method of distillation in a distillation apparatus comprising:
   generating, at or above atmospheric pressure, a first vapour having a first alcohol content;
   passing the first vapour to a vessel and condensing at least a portion of the first vapour to produce a liquid;
   treating, at or above atmospheric pressure, the liquid with at least one solid material housed in the vessel or in a chamber in fluid communication with the vessel; and
   generating, at or above atmospheric pressure, a second vapour from the liquid.

14. The method of claim 13 further comprising: passing the second vapour to one or more vapour treatment chambers and/or one or more vapour/liquid treatment chambers, wherein at least one of vapour and refluxing liquid interacts with material present in the one or more vapour treatment chambers and/or one or more vapour/liquid treatment chambers.

15. The method of claim 14, wherein the material in the at least one of the one or more vapour treatment chambers and/or one or more vapour/liquid treatment chambers comprises a colorant capable of extraction in the conditions prevailing in the one or more vapour treatment chambers and/or one or more vapour/liquid treatment chambers to provide a coloured distillate.

16. The method of claim 13, wherein the vessel is part of an apparatus for treating liquids the vessel comprising:
   a vapour inlet;
   a vessel for housing liquid;

a chamber configured to contain at least one solid material; and a vapour outlet;

wherein the vapour inlet, the chamber, and the vapour outlet are in fluid communication with the vessel for housing liquid; and wherein the apparatus is configured such that:

vapour passes from a vapour source into a liquid housed in the vessel via the vapour inlet at or above atmospheric pressure;

the liquid interacts with the at least one solid material contained by the chamber at or above atmospheric pressure; and vapour from the liquid passes to the vapour outlet.

17. The method of claim 13, wherein generating the first vapour having a first alcohol content comprises boiling a fermented precursor.

18. The method of claim 17, wherein generating the second vapour from the liquid takes place at a temperature below the boiling point of the fermented precursor.

19. A distilled product comprising one or more botanical extracts extracted in liquid phase at or above atmospheric pressure and at a temperature below the boiling point of a fermented precursor, and one or more botanical extracts extracted in vapour phase at or above atmospheric pressure.

20. The distilled product of claim 19 further comprising secondary products produced by reaction of botanical extracts extracted in liquid and/or vapour phase at a temperature at the boiling point of the fermented precursor and at or above atmospheric pressure.

21. A method of distillation in a distillation apparatus comprising:

generating a first vapour having a first alcohol content;

passing the first vapour to a vessel and condensing at least a portion of the first vapour to produce a liquid;

treating the liquid with at least a material housed in the vessel or in a chamber in fluid communication with the vessel;

generating a second vapour from the liquid; and passing the second vapour to one or more vapour treatment chambers and/or one or more vapour/liquid treatment chambers, wherein at least one of vapour and refluxing liquid interact with a material present in the one or more vapour treatment chambers and/or one or more vapour/liquid treatment chambers, and wherein the material comprises a colorant capable of extraction in the conditions prevailing in the one or more vapour treatment chambers and/or one or more vapour/liquid treatment chambers to provide a coloured distillate.

* * * * *